Sept. 17, 1968     P. B. OLMSTED     3,401,713
PREFILL VALVE

Filed Oct. 16, 1964     6 Sheets-Sheet 1

FIG.1

INVENTOR.
PETER B. OLMSTED
BY
*Burton & Parker*
ATTORNEYS

Sept. 17, 1968  P. B. OLMSTED  3,401,713
PREFILL VALVE

Filed Oct. 16, 1964  6 Sheets-Sheet 5

INVENTOR.
PETER B. OLMSTED
BY
Burton & Parker
ATTORNEYS

Sept. 17, 1968     P. B. OLMSTED     3,401,713
PREFILL VALVE
Filed Oct. 16, 1964     6 Sheets-Sheet 6

INVENTOR.
PETER B. OLMSTED
BY
Burton & Parker
ATTORNEYS

ତ୍ତ୍ତ୍ତ୍ତ୍ତ୍ତ୍ତ୍ତ୍ତ୍ତ୍ତ୍ତ୍ତ୍ତ୍ତ୍ତ୍ତ୍ତ୍ତ୍ତ୍ତ୍ତ୍ତ୍ତ୍ତ୍ତ୍ତ୍ତ୍ତ୍ତ୍ତ୍ତ୍ତ୍ତ୍ତ୍ତ୍ତ୍ତ୍ତ୍ତ୍ତ୍ତ୍ତ୍ତ୍ତ୍ତ୍ତ୍ତ୍ତ୍ତ୍ତ୍ତ୍ତ୍ତ୍ତ୍ତ୍ତ୍ତ୍ତ୍ତ୍ତ୍ତ୍ତ୍ତ୍ତ୍ତ୍ତ୍ତ୍ତ୍ତ୍ତ୍ତ୍ତ୍ତ୍ତ୍ତ୍ତ୍ତ୍ତ୍ତ୍ତ୍ତ୍ତ୍ତ୍ତ୍ତ୍ତ୍ତ୍ତ୍

3,401,713
PREFILL VALVE
Peter B. Olmsted, Ann Arbor, Mich., assignor to Olmsted Products Co., Ann Arbor, Mich., a corporation of Michigan
Filed Oct. 16, 1964, Ser. No. 404,394
18 Claims. (Cl. 137—112)

ABSTRACT OF THE DISCLOSURE

This disclosure relates to a prefill valve which is not only quick acting but will make a smooth transition between low pressure and high pressure fluid delivery, with the disclosure also showing a sleeve gate capable of expanding under fluid pressure after the gate has been shifted to a port-blocking position to effectively seal the port against high pressure leakage.

---

This invention relates to a valve particularly well suited for applications where it is desirable to pass a large volume of relatively low pressure fluid, abruptly block the flow of such fluid, and then hold, substantially without leaking, against a very substantial increase in fluid pressure. Such a valve may be termed a prefill valve, the name deriving from its use with hydraulic presses, rams and the like, where a large cylinder is rapidly prefilled with a low pressure fluid, such as during rapid movement of the press platen toward a closed position, and then the valve closes while the hydraulic pump feeds high pressure fluid to the cylinder to build up a very substantial thrust on the platen to effect the press forming, extrusion, or whatever operation is to be preformed under heavy thrust load.

Heretofore prefilled valves have universally been large, bulky and lacked sufficient speed of operation to take advantage of the closing momentum of the ram or platen to effectively apply the full high thrust loading simultaneously with it reaching its work preforming position.

An object of the present invention is the provision of a valve particularly well suited for handling large volumes of fluid flow and capable of very rapid shifting from one to another fluid flow-controlling position. As a consequence of this, cycle time of machines with which the valve may be used, can be reduced thereby resulting in higher production, and high pressure thrust may be applied at the proper instant to gain maximum advantage of momentum of the movement of parts of the machine.

Another object is the provision of a valve of high volumetric efficiency permitting a smaller overall size to handle the same volumes heretofore requiring larger and bulkier valves.

In one of the embodiments herein disclosed the valve is a two-way valve and will shift between a full flow and a no flow position with great rapidity. In another embodiment a three-way valve is shown in which flow from one port may be quickly blocked while flow from another port quickly instated. Both embodiments are well suited for high fluid volume applications.

Another object of the invention is the provision of a valve of the above character which though capable of very rapid shifting is not self-destructive, destruction being prevented by a novel dashpot design worked into the leading edge of the moving valve element.

Another object of the invention is the provision of a sleeve-type gate valve which may be rapidly shifted axially between open and closed positions without self-destruction, and which is so designed that it is self-sealing in its closed position. This self-sealing arises through a circumferential expansion of the sleeve under the influence of high internal fluid pressures.

To a substantial extent the speed of operation and self-sealing characteristics, the compactness of the design and many of the other advantages of the valve, arises from using a sleeve-type gate construction reciprocably supported in a flow bore whose inner surface defines a plurality of fluid flow windows, the edges of the windows serving themselves to guide the sleeve and thereby overcoming the necessity, as in the prior art, for a long guide bearing disposed axially spaced from the flow path. The sleeve gate is of such a construction that it will expand radially under high internal pressures sealing itself against the window edges to positively prevent high pressure leakage when it is in its flow-blocking position.

The design of the valve is such that high pressure fluid is conserved and utilized to allow substantially no "dwell" in application of high fluid pressures during transition of the valve between open and closed positions.

A novel pilot valve arrangement is provided to facilitate rapid operation.

Other objects, advantages and meritorious features will more fully appear from the specification, claims, and accompanying drawings, wherein:

3-way valve

Figure 1:
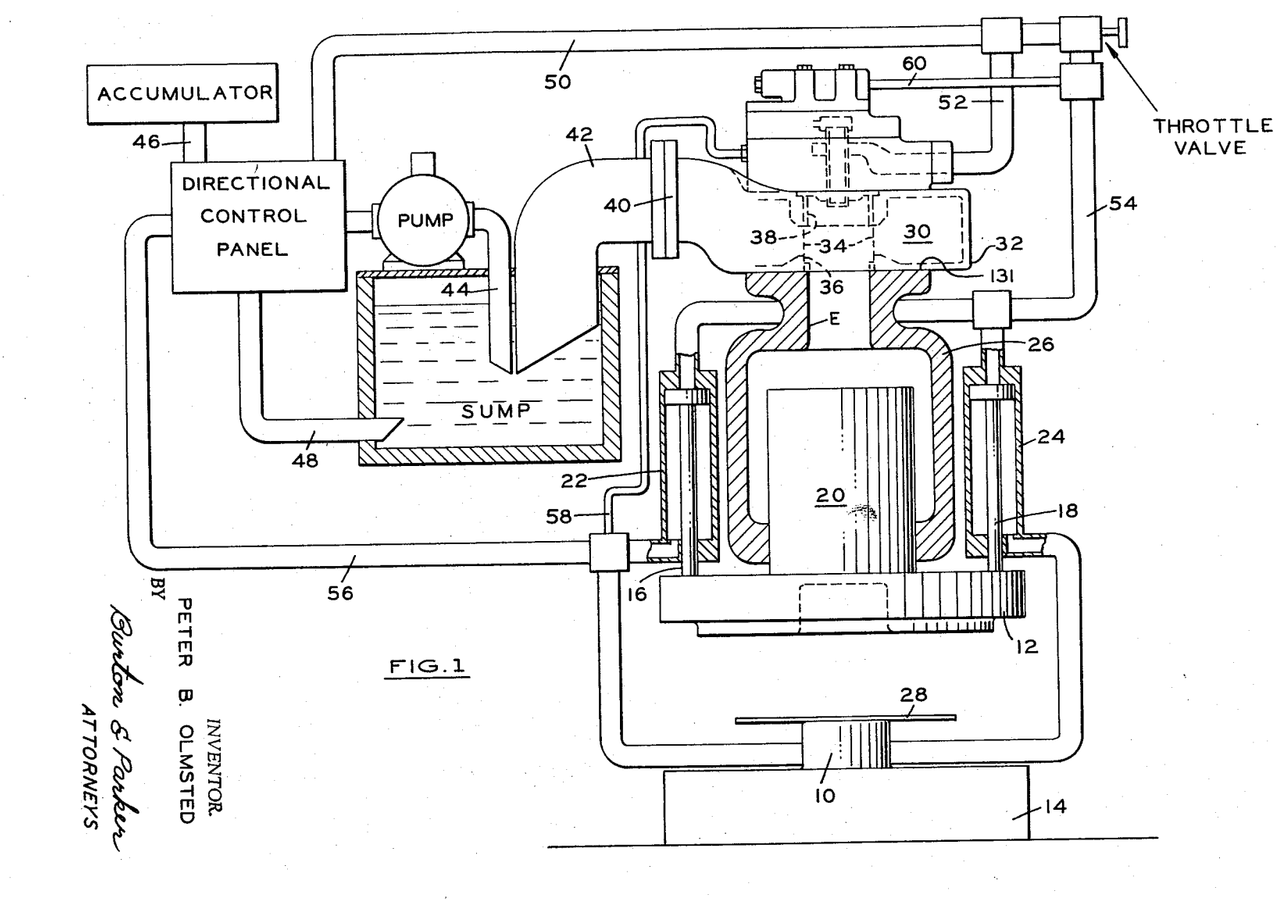
FIG. 1 is a schematic view of an hydraulic press showing my 3-way prefill valve and related apparatus associated therewith.

The 3-way valve in association with a press as shown in FIG. 1 will be first described, though occasional reference may be made to FIGS. 5–8 where structure common to both the 2-way and 3-way valves may be conveniently described.

In FIG. 1 an hydraulic press is schematically shown having opposed dies 10 and 12, die 10 being mounted on a bed 14 and die 12 being secured to the lower end of pistons 16, 18 and ram 20. Cylinders 22, 24 and 26 are suitably supported in the frame of the press. Cylinders 22 and 24 and their associated pistons move die 12 rapidly toward and from die 10 while cylinder 26 and its associated ram 20 serves to apply the high pressure force on die 12 to shape a workpiece 28 between the dies. Various arrangements of cylinders 22, 24 and 26 may be encountered in press designs and that shown herein is intended only as a schematic representation to illustrate operation of the prefill valve.

The prefill valve is indicated at 30 and is mounted atop the main or ram cylinder 26 and includes a low pressure shroud 32 which opens centrally through a plurality of ports or windows 34 into passageway 36 in the valve which communicates with the inlet E of the ram cylinder. The windows are adapted to be closed by a gate 38. A flange 40 on the shroud connects it to a low pressure high volume fluid pressure line 42 whose end communicates with hydraulic fluid in a sump.

A high pressure pump has an inlet 44 communicating with the sump and a high pressure discharge line communicating with a directional control panel. Various fluid pressure lines extend from the control panel to the press and its associated equipment. Line 46 connects the panel to a high pressure accumulator; line 48 is a discharge line from the panel to the sump; line 50 connects the panel through branches 52 and 54 respectively to the prefill valve and upper ends of cylinders 22 and 24. A throttle valve is disposed between line 50 and branch 54 to regulate the speed of opening and closing of the dies. Upon pressurization of line 50, pistons 16 and 18 are shifted downwardly. Line 56 connects the panel to the lower ends of the cylinders 22 and 24. Branches 58 and 60 respectively connect lines 56 and 50 to the prefill valve.

When the control panel is operated, as by a workman pushing a start button (not shown) line 50 is connected to the pump discharge and fluid pressure in the accumulator, and line 56 is connected to line 48 with the result that fluid pressure is delivered through the throttle valve to the upper ends of cylinders 22 and 24 and pistons 16 and 18 shift die 12 downwardly. As ram 20 descends in its cylinder 26 by virtue of the fact that it is connected to die 12, the partial vacuum created in cylinder 26 draws fluid from the sump through line 42 into the shroud 32, and thence through passageways 36 and E into cylinder 26 whereby such cylinder is prefilled with low pressure fluid from the sump. When die 12 encounters workpiece 28 the gate 38 is closed, as hereinafter described, blocking communication between the shroud and passageway 36 and high pressure fluid is admitted to cylinder 26 to increase the thrust of die 12. Where a 3-way prefill valve is used, as contemplated in FIG. 1, the high pressure fluid is admitted to the cylinder 26 through special porting in the valve, as hereinafter described. If a 2-way prefill type valve is used, then high pressure fluid is admitted to cylinder 26 through some other suitably arranged piping, the prefill valve merely serving to block flow between the sump and passageway E as high pressure builds up in the ram cylinder.

If the transition from low pressure fluid admission to cylinder 26 to high pressure fluid admission can be attained quickly and smoothly, advantages will result as heretofore mentioned. The 3-way prefill valve herein disclosed accomplishes rapid smooth transition.

Figure 2:
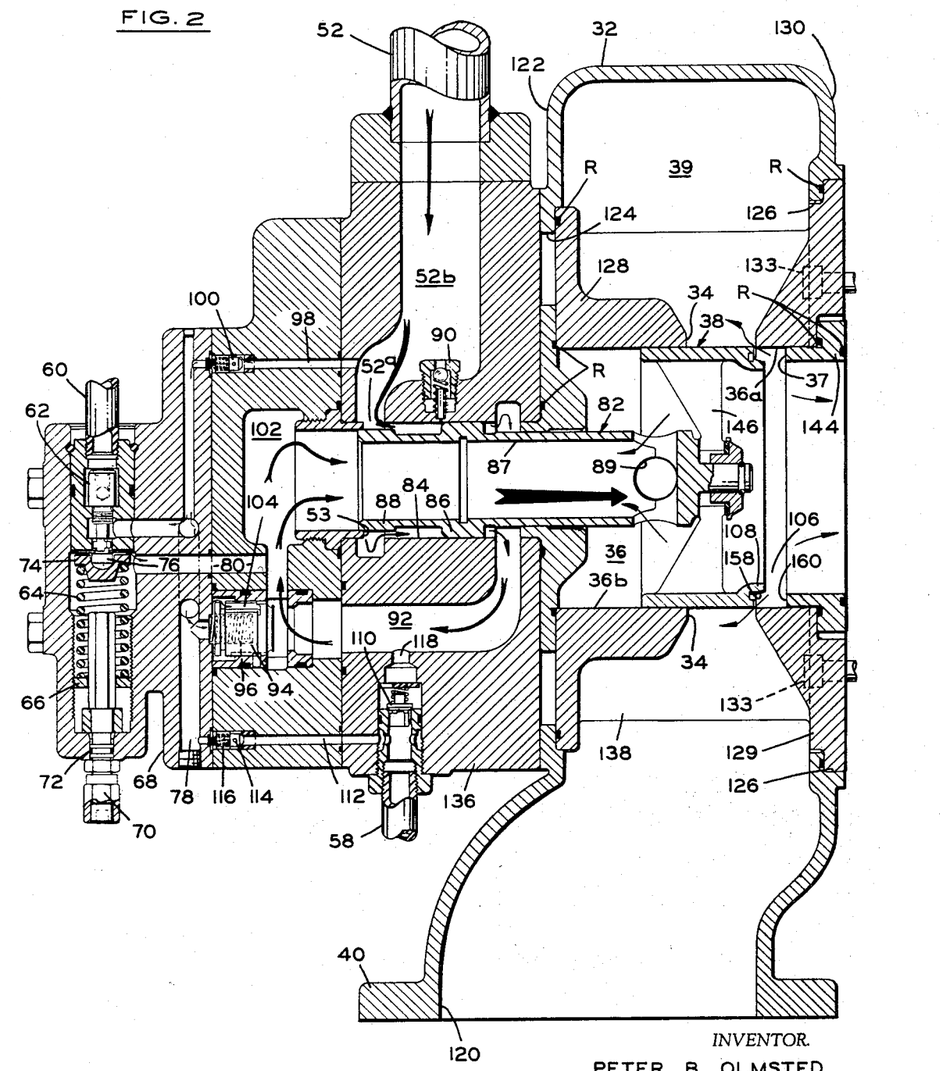
FIG. 2 is a schematic view of the 3-way prefill valve of FIG. 1 with the gate moving toward the closed position, and for convenience of the drawings the valve is shown rotated 90 degrees from the FIG. 1 position.
Figure 3:
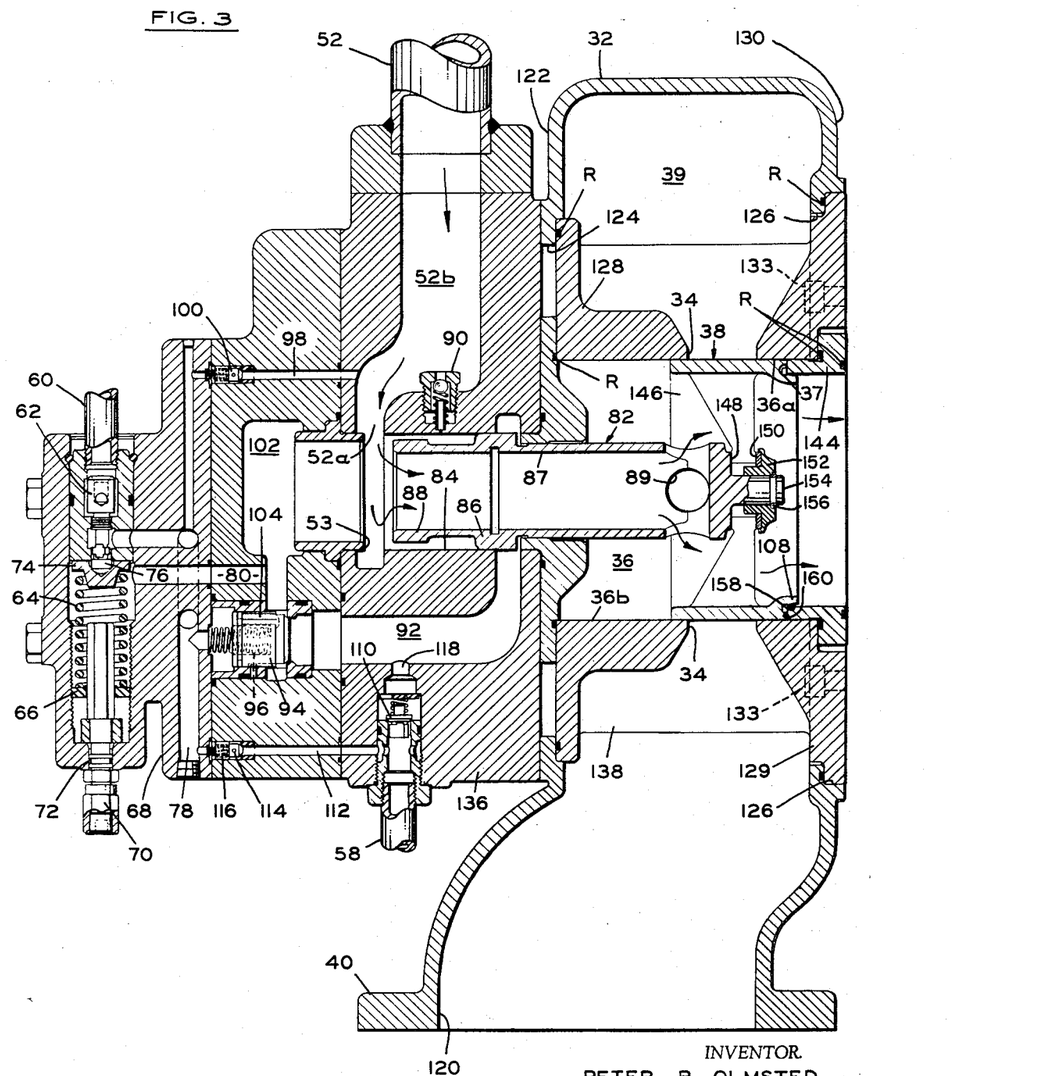
FIG. 3 is similar to FIG. 2 but with the gate in its closed, flow-blocking position.
Figure 4:
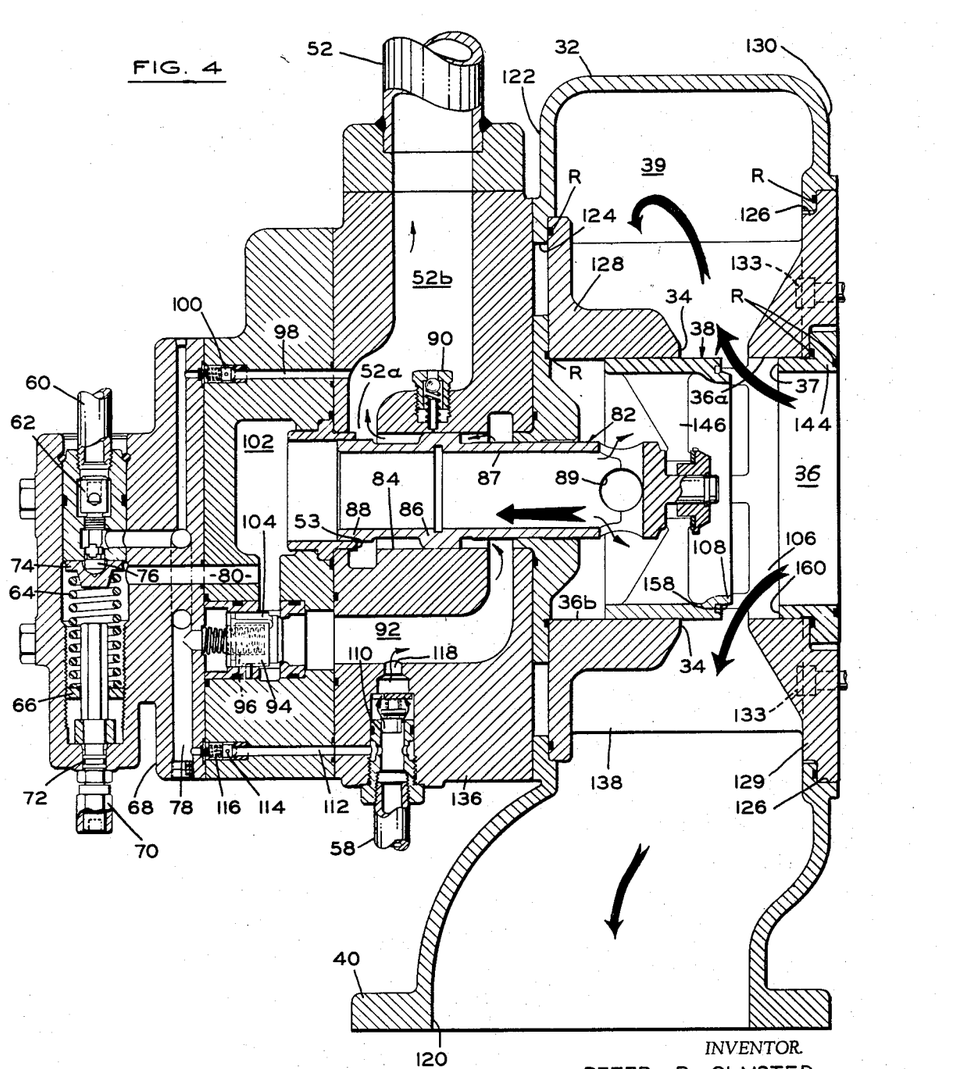
FIG. 4 is similar to FIG. 2 but with the gate opening.

In the particular embodiment disclosed in FIGS. 2–4, a predetermined increase of back pressure in line 54, occasioned by die 12 encountering sufficient resistance to movement against workpiece 28, triggers operation of the prefill valve to close gate 38 and admit high pressure fluid to cylinder 26 through the valve. This back pressure is sensed through line 60 by an adjustable pressure-responsive pilot valve 62 spring loaded at 64 as shown in FIG. 2. In such figure the pilot is shown open. At one end of the spring bears against externally threaded part 66 threadedly mounted in housing 68 and mounted on adjusting stem 70 for rotation therewith and axial travel thereon. The stem may be octagonally shaped in cross section and the part 66 may be correspondingly shaped so that as stem 70 is rotated the part 66 will be rotated while travel along the stem is allowed. The stem is suitably sealed as at 72 in the housing.

The other end of spring 64 is seated on retainer 74 housing a valve element 76 that is shown as lifted off its seat thereby initially bleeding pressure from passageway 78 to passageway 80. The fluid pressure at which valve 62 will be shifted to bleed from 78 to 80 may be adjusted by the stem 70 to vary the thrust of spring 64.

The gate 38 is shown in FIG. 2 as nearing its flow-blocking position, i.e. its position blocking flow between shroud 32 and passageway 36. When the gate is in its fully open position it is displaced upwardly to the phantom outline position of FIG. 1 (or fully to the left in FIG. 2), so that its lower, or right-hand edge, does not obstruct the windows or ports 34. The gate is shown in its fully closed position in FIG. 3. In the fully open position of the valve the actuating means for shifting the gate is also retracted fully to the left. Such actuating means comprises a piston 82, as shown in FIG. 2, mounted in a bore 84, the piston having lands 86 and 88 of unequal diameters which are received in supported relation in complemental portions of bore 84. In the fully open position of the gate 38, land 86 is disposed to the left of ball check 90 whereby high pressure fluid in line 52 communicates through check 90 with passage 92 to the right of land 86, such fluid pressure acting against quick-acting poppet or what may be termed a sequence valve 94.

When gate 38 is fully open, and before fluid pressure in line 60 rises sufficiently to cause the fluid pressure-responsive pilot valve 62 to shift as aforesaid, poppet 94 is held closed by its spring 96, as high pressure fluid balance is established across valve 94 by virtue of passage 98 establishing communication between high pressure fluid in line 52 and passageway 78 through check valve 100. However, when pilot valve 62 shifts bleeding pressure from 78 to 80, the resulting unbalance across valve 94 overcomes spring 96 and valve 94 pops open. This has the immediate effect of discharging fluid pressure in 92 into the low pressure area of chamber 102 at the closed end of bore or cylinder 84 and allowing the resulting unbalance of pressures across land 86 to allow high pressure fluid in line 52 acting against the left-hand side of land 86 to shift piston 82 to the right closing the gate. The time lag between the opening of valve 94 and the institution of the closing movement of the gate in view of the proportioning of the passageways, is substantially instantaneous. The construction of the quick-acting poppet 94 is such that as soon as it opens approximately 1/16 of an inch it will allow fluid pressure to escape directly from passage 78 into chamber 102, as through the notch 104 as indicated by the light arrow.

In the closing movement of the gate, fluid in passageway 92 is discharging from the low pressure side (right-hand side as viewed in FIG. 2) of land 86 into chamber 102 which is in communication with passage 36 through the hollow interior of the piston 82 and thus the first high pressure fluid begins to feed into the low pressure fluid to subject the ram cylinder to high pressure. This initial high pressure feed together with the displacement effect of the gate commences the smooth transition from low to high pressure conditions in passageway 36. The heavy dark arrows in FIG. 2 indicate the direction of major high pressure fluid flow during initial stages of gate closing. As the gate reaches the position shown in FIG. 2 in which it is nearly closed, fluid flow in the passageway 36 is represented by the light arrows which indicated that low pressure flow in the shroud 32 through the windows 34 into passage 36 has now ceased and in fact some reverse flow is occurring. The displacement effect of the piston 82 into the passage 36 is causing some reverse flow into the hollow piston 82. It should be appreciated, of course, that the flow represented by the light arrows shown in FIG. 2 lasts but a fraction of a second and represents theoretical fluid flow or pressure conditions. As the oil below the descending gate is being pressurized at a greater rate than back flow out through the windows 34, there is a net increase in the pressure of the fluid in passageway 36. In FIG. 2 the gate 38 is moving at top speed toward the flow-blocking position. The operation of the sequence valve 94 is such that it will shift to its open position probably before the gate 38 has a chance to accelerate to even half of its terminal velocity. With the gate moving at high speed in the FIG. 2 drawing, all of the flow from line 52 is effectively being used to fill the bore 84 to the left of land 86, i.e. behind the piston. Since under proper circumstances this flow may exceed 600 to 700 gallons per minute, it can be seen that compression of the oil in passage 36 and thus in the main cylinder 26 can be achieved very rapidly. It is to be noted that oil flow from passage 92 plus the effective flow due to the displacement of piston 82 into the passage 36 is greater than the flow entering by way of line 52.

As the gate 38 reaches the end of its stroke and begins to decelerate (as hereinafter explained) both the displacement rate of piston 82 and the flow from passage 92 in the direction of the arrow falls. However, before this can happen, the fluid entering at 52a is allowed to pass directly into the passage 36 through the opening between the left-hand end of land 88 and the edge 53 of port 52a and thence through the interior bore 87 of piston 82 and through the openings 89 in piston 82 and into passage 36 through the openings 89 in the lower end of the piston. The flow into passageway 36 from the shroud 32 is thus interrupted as the gate 38 closes off the flow of atmospheric oil, and high pressure oil is substituted for the low pressure oil.

In one design of the valve where 700 gallons per minute enters through line 52, while the piston 82 and gate 38 is advancing, the piston and gate will be moving at 2,250 feet per minute before deceleration starts. In order to prevent self-destruction of the piston 82 and gate 38, the piston-gate assembly must be decelerated at a moderate rate. This is accomplished by the pressure built up in an annular pocket 106 created when the lip 108, which is of annular configuration, closely approaches the gate seat 37 as shown in FIG. 2. A maximum pressure of 2,000 p.s.i. is created in this pocket 106 during deceleration in one embodiment of the invention which has been tested.

FIG. 3 shows the situation after complete deceleration of gate 38 when all of the oil entering by line 52 is flowing through bore 87 in piston 82 and out of aperture 89 into passage 36. When this stage in the cycle is first reached the sequence valve 94 is closed by its spring 96, thus resetting the valve. FIG. 3 also shows a situation that makes the loss of high pressure oil due to leakage between the outside diameter of the sleeve gate 38 and the inside diameter of the bore 36b extremely small. It will be noted upon examination of this figure that pressure on the inside of the gate 38 will have the tendency to make it expand, and as a result of the particular construction of the gate and its connection to the piston 82, hereinafter explained, the gate 38 does expand under the internal pressure to close the clearance between the outside diameter of the gate and the inside diameter of bore 36b on opposite sides of windows 34 to seal against escape of high pressure fluid from the passage 36 back into the shroud 32. There is a nominal clearance between the gate and the bore of a half a thousandth of an inch at atmospheric pressure. It is estimated that this clearance becomes zero at 1,000 p.s.i pressure inside the gate in a preferred design of the prefill valve.

After completion of the working portion of the cycle, the directional control panel is operated, as by the workman depressing a reversing button (not shown), or any other convenient means, to cause line 52, connected to line 50, to discharge to the sump through line 48. This action results in decompression within passage 36 back through the interior of the gate and within the bore 87 of the piston while the gate and piston are in the position shown in FIG. 3. After decompression in line 52 has reached a determined point, as sensed by the directional control panel, the pump discharge is switched so that it is connected to line 56 whereby high pressure fluid is admitted to the lower ends of jack cylinders 22 and 24 to return the die 12 and ram 20 upwardly. This action causes oil to enter the prefill valve through line 58 and check valve 110. Such high pressure oil entering through line 58 is applied in passage 92 to exert its force against the right-hand end of land 86 thereby shifting the piston 82 to the left, as shown in FIG. 4, and moving the gate 38 to uncover the windows 34 whereby reverse flow may occur out of the main cylinder 26 and back through the shroud 32 and thence into line 42 to be dumped into the sump. Under these circumstances the sequence spool 94 is prevented from opening by pump pressure from line 58 through passageway 112 and check valve 114 which is spring loaded to prevent reverse flow by spring 116 and thence into passageway 78 to act against the left-hand end of the sequence spool. The effect of the fluid pressure delivered through passageway 112 into passageway 78 to act against the left-hand end of the sequence spool provides a greater force against the spool than the force of fluid pressure in passageway 92 because of unequal effective areas of the sequence spool. The rate at which gate 38 will open will be a function of the size of orifice 118. In FIG. 4 the flow of oil is shown by the arrows and indicates how the oil entering through orifice 118 returns the piston 82 to the left allowing a majority of the oil from the ram to escape to the shroud 32 and out through line 42.

Figures 5, 6:
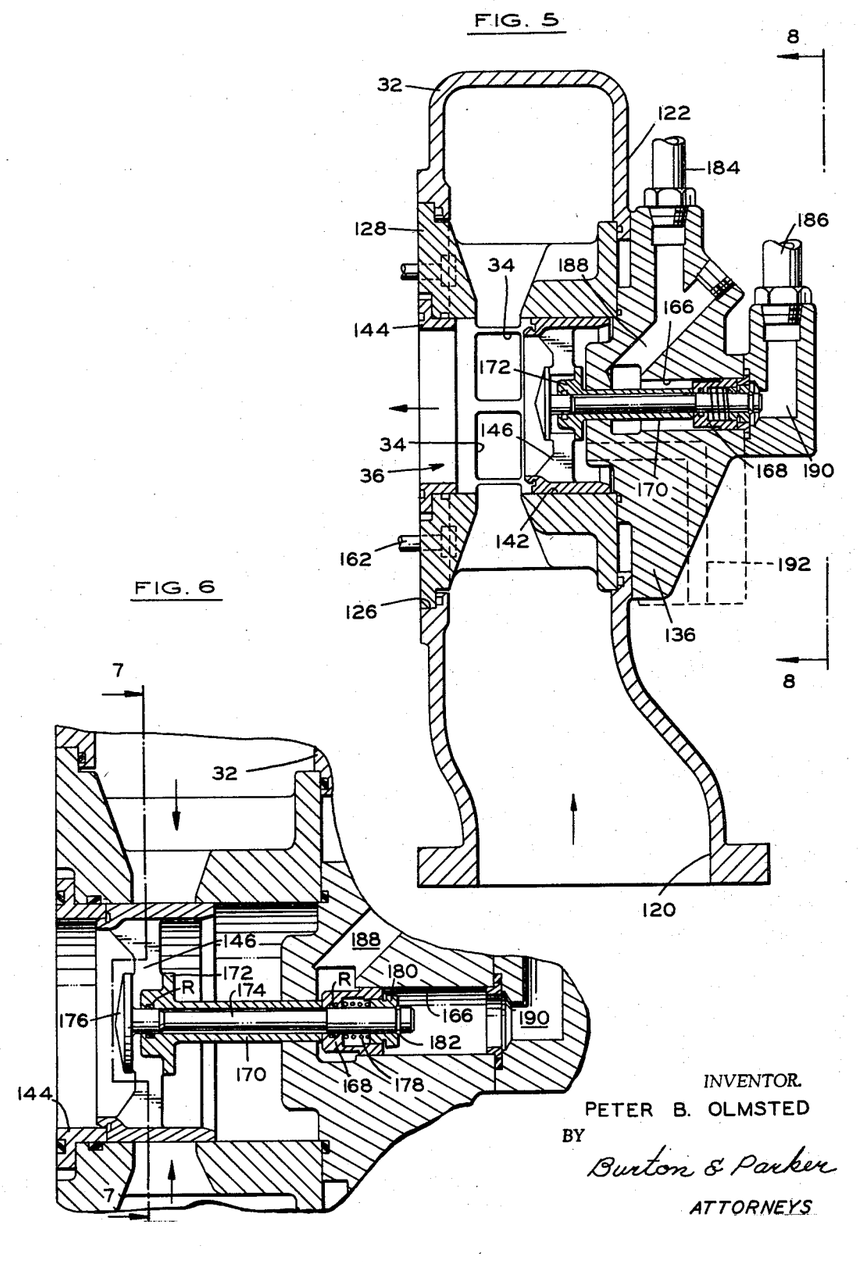
FIG. 5 is a cross-sectional view through a 2-way prefill valve.
FIG. 6 is a cross-sectional view taken on the line 6—6 of FIG. 5.
Figure 7:
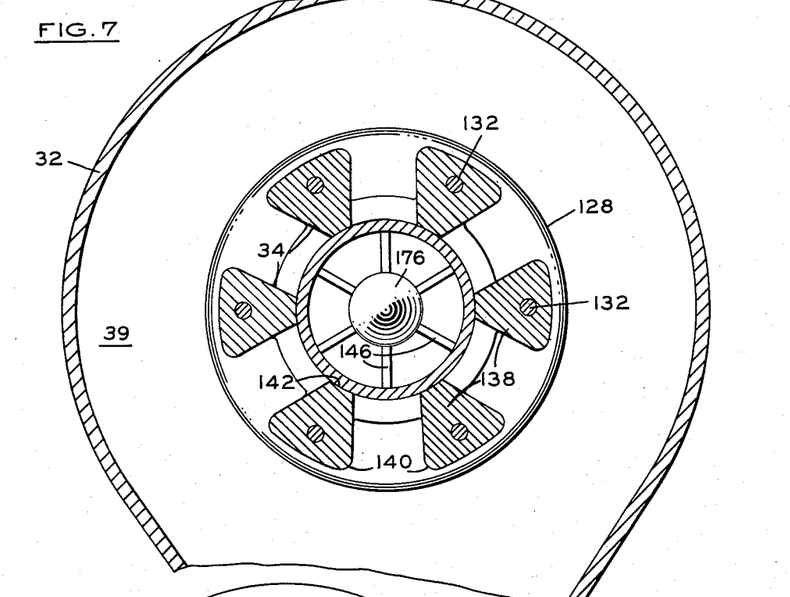
FIG. 7 is a cross-sectional view taken on the line 7—7 of FIG. 6.
Figure 8:
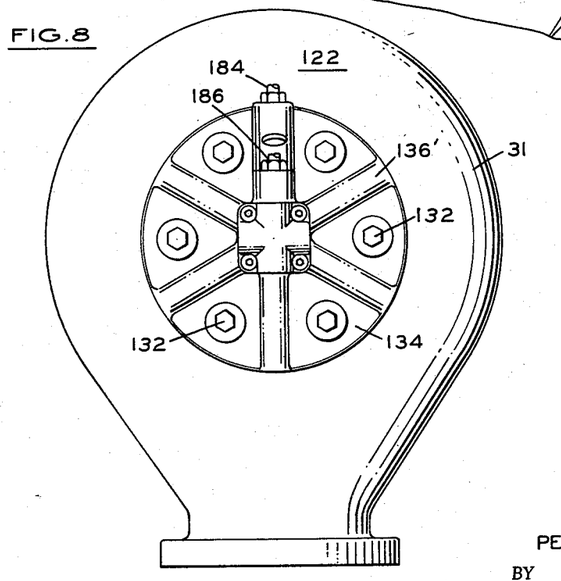
FIG. 8 is an end view of the valve of FIG. 5 taken along the plane 8—8 thereof.

The shroud 32 disclosed in FIGS. 1–4 is essentially the same as the correspondingly numbered shroud in FIGS. 5 and 8. It has a fluid flow opening 120 which, in one test embodiment, is 8 inches in diameter. The opening communicates with the interior of the shroud which is of annular configuration. The rear face 122 of the shroud is provided with a cylindrical opening 124 and the forward face is provided with a cylindrical opening 126 within which openings is received the cylindrical block 128 which defines the ports or windows 128. It will be noted that opening 124 is smaller than opening 126 and that each opening is provided with a stepped seat to facilitate effecting a seal between the block 128 and the shroud. The block has an end flange 129 adapted to seat against the surface 131 of the ram cylinder 26 circumjacent the passage E and be bolted thereto by volts 133. After bolting the block to the ram cylinder, the shroud 32 is telescoped over the block and bolted thereto by bolts 132 (see FIGS. 6 and 7), the heads of which overlie a flange on the valve housing member 136, similar to the flange 134 of the valve housing member 136' in FIG. 8. The inner ends of the bolts are threadedly engaged in the block 128 as in FIG. 7.

The cylindrical block 128 is provided with six large windows 34 which extend radially in circumaxially equidistantly spaced relation around the block and open from its outer circumference into its bore 36b. A study of FIGS. 5 and 7 will readily indicate the character of the windows. It will be noted that they are defined by generally triangularly shaped axially extending wall segments 138 of the block with each such segment having rounded corners 140 and that the segments are generally streamlined to provide a streamline flow of fluid through the windows. Each segment is provided with a cylindric surface 142 which is co-cylindric with the bore 36b. In fact it might be said that cylindric faces 142 simply define continuations of the passageway 36 between portions 36a and 36b. Such cylindric faces serve to support the gate 38 for axial shifting. It will be noted from FIG. 7 that the windows comprise virtually 360 degrees of the circumference of the bore within which the gate shifts. The windows allow an entrance velocity for the oil of approximately 60% of the final velocity reached in passageway 36 where the opening 120 of the shroud is 8 inches and the diameter of passage 36 is 6 inches. It is estimated that the pressure drop across the valve between shroud opening 120 and the opening of passageway 36 through the forward end of the valve is less than half of that across competitive valves delivering the same quantity of oil to a cylinder of equal inlet size. This is because of the desirable oil circulation which can be effected by havnig the oil travel circumferentially around the block 128 entering the bore thereof through the windows 34. This is one of the most important characteristics of the valve because it will allow the use of a ram cylinder inlet one-half in area that heretofore required. It will be noted that passageway 36 is surrounded by an annular passageway which is defined by the periphery of the block and the inner walls of the shroud 32, and that the block itself provides a wall common to these two passageways, with the windows 34 opening therebetween.

Because the gate 38 is supported by the cylindric faces of the segments 138 of block 128, the overall length of the prefill valve may be reduced from that existing in currently available prior art valves. The reason for this is that the gate is supported by such cylindric faces and does not require a long supporting rod which must be suitably carried in bearings disposed to one side of the port or ports which the valve element must close. The piston 82 does not serve to support the gate 38 but rather is floatingly connected to it and the function of the piston is simply, as related to the gate, to shift the gate axially between its open and its closed positions.

It will be noted that the bore portion 36a of the block 128 is provided with an annular insert 144 which carries suitable sealing rings R for establishing a fluid-tight seal between the block 128 and the surface 131 surrounding the ram cylinder inlet against which the prefill valve is mounted. All of the sealing rings are identified by the letter R and may be of any suitable material such as elastomeric O-rings and the like. Not all such seals are so referenced but the necessary seals are shown. Insert 144 also cooperates with bore portion 36a of the block to provide a step or in effect a counterbore with which the lip 108 of the gate cooperates as above mentioned to define the pocket 106 within which oil is trapped to decelerate the high speed movement of the gate during its closing.

The gate 38 comprises a continuous sleeve having six radially inwardly extending webs 146. The webs are rigidly secured to the inside surface of the sleeve and are floatingly connected at their inner ends to the end of the piston 82. As shown in FIG. 3 the inner ends of the webs 146 abut at the left-hand side the lower end face of the piston 82 as at 148 while the right-hand sides are disposed against washer means 150 which is in turn backed up by a retainer 152 secured on the projecting end 154 of the piston rod by a snap ring or the like 156. The fit is such that the webs 146 may float radially relative to the axis of the piston rod 82. As a consequence, upon the application of high pressure to the inside wall of the sleeve gate 38, the sleeve may expand against the bore 36a and 36b and the cylindric faces 142 between the windows of block 128.

As shown in FIG. 2 the forwardly projecting lip 108 of the gate is provided with an inclined external surface 158. This surface is inclined at about 20 degrees from the axis of the sleeve and cooperates with the edge 160 of the insert 144 to provide a fluid pressure escape path for oil trapped within the pocket 106, such escape path being of increasingly smaller cross section as the gate nears its fully closed position. As a consequence the rate at which oil trapped in pocket 106 may escape therefrom decreases as the gate approaches its fully closed position and in this fashion deceleration of the gate may be accomplished without imposing destructive shock forces on the gate.

2-way valve

The 2-way valve is disclosed in FIGS. 5–8 inclusive and as beforementioned the shroud 32 is substantially identical with the shroud for the 3-way valve, as is the block 128, and for such reason the same reference numerals are used. The gate 38 for the 2-way valve is identical with that for the 3-way valve. The housing 136′ for the gate piston differs however from that of the 3-way valve. It is provided with a radial flange 134 heretofore mentioned. The block 128 is provided with a plurality of bolts 162 for securing the block over the entrance port of the cylinder to which the valve is to be attached. The block is first mounted on the cylinder and the bolts 162 tightened. Thereafter the shroud and housing 160 may be secured to the block as by the bolts 132.

Housing 160 is provided with a bore 166 within which is supported for movement a piston 168 provided with a two-piece piston rod. The two-piece piston rod comprises a sleeve member 170 having a radial flange 172 adapted to overlie one side of the webs 146 of the gate. The other part of the piston rod comprises a rod-like element 174 having an enlarged head 176 which overlies the opposite side of the webs with the body portion of the rod-like member extending through the sleeve and through the piston 168. The piston is hollow to receive a spring 178 bearing at one end against the bottom of the hollow interior of the piston and at the other end against a retainer 180 received over the adjacent end of the rod-like member 174 and secured thereon by a snap ring or the like 182. Suitable seals are provided at R to prevent the escape of fluid pressure axially along the rod-like member. The spring 178 serves to maintain the head 176 against the webs to hold the webs in embraced relation between the head 176 and the flange 172 thereby allowing floating action of the gate relative to the piston rod.

The cylinder 166 within which the piston reciprocates communicates with fluid pressure lines 184 and 186 by way of passages 188 and 190 respectively. Upon pressurization of line 190 and exhausing of line 184 the piston will be shifted to the left from the position shown in FIG. 5 to that shown in FIG. 6 to shift the gate to its flow-blocking position. It will be noted that the gate is provided with the forwardly extending lip whose cooperative action with the insert 144 is as before described. Upon reverse pressurization of lines 184 and 186 the piston will be shifted from the position shown in FIG. 6 to that of FIG. 5 to move the gate to its non-flow-blocking position uncovering the windows 34. In phantom outline at 192 is shown a passageway for admitting high pressure fluid to the passage 36. Passage 192 would be controlled by any suitable valving arrangement.

Summation

From the foregoing description it will be apparent that the shroud 32 provides an annular flow passageway which surrounds a cylindrical flow passageway defined by the bore portions 36a and 36b of the block. It will further be apparent that the inner cylindrical wall of the annular flow passageway is common to the cylindrical wall of the passageway portions 36a and 36b. Further, there are a plurality of circumaxially spaced-apart ports or windows 34 which extend through such common wall and establish communication between the passageways with those portions of the common wall between the ports or windows being streamlined as shown particularly in FIGS. 5 and 7 and having inner edge faces 142 which are of cylindric shape and which extend co-cylindrically with the surface of the wall which defines the cylindrical flow passageway portions 36a and 36b. It is further apparent that a sleeve gate is supported within the cylindrical flow passageway for reciprocation axially thereof. It is supported in such passageway by the wall portions 36a and 36b and cylindric edges 142 of those portions of the wall between the windows. It is further apparent that during at least a portion of the shifting of the gate it is supported by such edge portions 142. With particular reference to the 3-way valve it is further understood that bore 84 defines a cylinder which is coaxial with the passageway 36 at one end of such passageway and that the piston 82 is mounted in such cylinder and is coupled to the gate to shift it. Furthermore there are a pair of fluid passageways opening into the cylinder on opposite sides of the piston, namely, passageways 52b and 92. Passageway 52 is adapted to be connected to the source of high pressure fluid to shift the piston in one direction while the passageway 92 communicates with the flow passageway 36 and is provided with a control valve 94 which blocks flow from the cylinder 84 to prevent shifting of the piston in the direction caused by fluid pressure in passageway 52b. Further there are means for opening the control valve 94 to dump fluid from the cylinder 84 into the passageway 36 to allow movement of piston 82 under the influence of fluid pressure in passageway 52b.

To decelerate the gate a lip is provided in its leading edge which cooperates with a counterbore to trap fluid under pressure and allow a controlled escape of such fluid as the gate reaches its fully closed position.

What is claimed is:

1. In a valve having a cylindrical flow passageway provided with a laterally opening port, a circumferentially and radially expansible and contractible sleeve member sized in its unstressed condition to closely fit the cylindrical passageway and supported therein for axial reciprocation between a position bridging the port blocking flow therethrough and an axially displaced position uncovering the port, an actuating member extending coaxially of the sleeve member for shifting the same between the aforesaid positions, a plurality of radially extending webs connected at one end to one of said members with the other member having web embracing portions holding the webs against relative axial shifting while permitting radial movement between the webs and such member, and said sleeve member circumferentially expanding under influence of internal fluid pressures exceeding the fluid pressure in the port to seal against the passageway while bridging the port to prevent leakage from the passageway out through the port.

2. The invention as defined in claim 1 characterized in that said webs are independent of each other and are integral with the sleeve member and extend radially inwardly, and said web embracing portions are on the actuating member.

3. The invention as defined in claim 1 characterized in that said flow passageway is provided with a counterbore having an annular bottom wall into which counterbore an end of the sleeve member projects when in flow blocking position, said counterbore in combination with said end of the sleeve member defining an annular dashpot during approach of the sleeve member within the counterbore toward the annular bottom wall to decelerate and substantially stop the sleeve before contact of said end of the sleeve with said annular bottom wall.

4. The invention as defined in claim 1 characterized in that the leading edge of the sleeve during movement to the port-blocking position is provided with an annular forwardly projecting lip and the cylindrical flow passageway is provided with an annular seat with which the lip cooperates to define an annular pocket from which fluid escapes as the leading edge of the sleeve approaches such seat to decelerate movement of the sleeve as it shifts to its port-blocking position.

5. In a valve having a cylindrical flow passageway and a port opening laterally through the wall of the passageway, a sleeve gate supported in the passageway for axial reciprocation from one side of the port to a flow blocking position bridging the port and blocking flow therethrough, said passageway provided at the other side with a counterbore having an annular shoulder at the bottom thereof, that end of the sleeve gate opposed to said shoulder having a radial face for mating with an axially opposed surface of the shoulder, an annular axially forwardly projecting lip on said sleeve gate adapted to project into the counterbore beyond said shoulder but lying closely adjacent the edge of the shoulder, said lip having an outer circumferential face tapering axially forwardly and radially inwardly to define with the edge of the shoulder a fluid escape passageway of decreasing cross section as the sleeve approaches the bottom of the counterbore to provide a controlled escape of fluid pressure between the axially opposed faces of the counterbore and sleeve as the sleeve reaches its flow blocking position, and means coupled to the sleeve for axially shifting it rapidly toward said flow blocking position.

6. In a valve having a cylindrical flow passageway and a port opening laterally through the wall of the passageway, a sleeve gate supported in the passageway for movement from a position uncovering the port to a flow blocking position covering the port, said sleeve being radially and circumferentially expansible and contractible in said flow blocking position and expansible under the influence of internal fluid pressure exceeding fluid pressure in said port, means for shifting the sleeve gate as aforesaid including an actuating member extending axially of the sleeve and having opposed radially extending sleeve embracing elements, a plurality of radially extending individual webs arranged at circumaxially spaced locations and secured at their outer ends to the interior of the sleeve and at their inner ends received between said elements, said webs being shiftable radially between said elements but held thereby against relative movement in at least one other direction.

7. The invention as defined in claim 6 characterized in that said elements are spring tensioned toward each other to grip the webs therebetween.

8. In a valve having a cylindrical flow passageway and a port opening laterally through the wall of the passageway, a sleeve gate supported in the passageway for axial reciprocation from one side of the port to a flow blocking position covering the port, said sleeve being radially and circumferentially expansible in said flow blocking position under the influence of internal fluid pressures exceeding the pressures in said port to fluid tightly seal the port, said sleeve provided with a plurality of radially inwardly extending webs, an actuator for shifting the sleeve axially between the aforesaid positions including a member extending coaxially of the sleeve and provided with a radially extending face overlying one axially facing edge of each web to urge the sleeve in one direction, and means tensioning the webs against said face including a part resiliently connected to said member and having a face overlying the opposite axially facing edge of each web and tensioned thereagainst, said tensioned engagement of the webs and actuating member allowing radial movement of the webs relative to said member while providing substantially no axial movement of the webs and member in at least one direction of axial movement of the member.

9. In a valve, a valve block provided with a cylindrical flow passageway, a shroud telescoped over the block and cooperating therewith to define an annular flow passageway around the block, a plurality of circumaxially spaced apart ports opening laterally through the block and establishing communication between the passageways, each port being of streamlined configuration between the passageways to minimize fluid turbulence, a sleeve gate supported in the cylindrical passageway by the cylindrical wall thereof for axial reciprocation from a position uncovering the ports to a position blocking the ports, means connected to the sleeve gate to shift it axially between said positions, and fastener means cooperating with the shroud and having portions extending into the block between the ports to secure the shroud to the block.

10. In a three-way prefill valve, a cylindrical flow passage for communication with a chamber to be prefilled, a port opening laterally through a wall of the passage for communication with a source of prefilling fluid, a sleeve gate supported in the passage for axial movement from a position uncovering the port to a position blocking the same, a cylinder coaxial with the passage at one end thereof, a piston in the cylinder coupled to the sleeve gate to shift it as aforesaid, a pair of fluid passageways opening into the cylinder on opposite sides of the piston for delivering powering fluid to the cylinder to control movement of the piston, a first one of said pair of fluid passageways adapted to be connected to a source of high fluid pressure for shifting the position in a direction moving the sleeve gate to its port blocking position, the other of said fluid passageways communicating with said flow passage and provided with a control valve blocking flow from the cylinder to the flow passage to prevent movement of the piston shifting the sleeve gate to its flow blocking position, a third fluid passageway communicating with the cylindrical flow passage and with said first one of the fluid passageways, a valve in the third fluid passageway operatively connected to said piston to open and deliver high pressure fluid to the cylindrical flow passage when the piston shifts in a direction moving the sleeve gate to its port blocking position, and means for opening said control valve to dump fluid from the cylinder into said flow passageway and allow movement of the piston under the influence of fluid pressure in said first one of the pair of fluid passageways.

11. A prefill valve for mounting on a ram cylinder or the like comprising: a cylindrical flow block having an axial flow passage and ports opening radially outwardly through the block from the passage, said block having at one end an annular flange for abutting the ram cylinder and at the opposite end a flange of smaller diameter than the first flange, a generally annular internally open shroud having an external lateral port with the inside diameter of the shroud sized to allow telescoping of the shroud over the block with one face of the shroud abutting the first flange of the block and seated in sealed relation thereon and the other face of the shroud seated in sealed relation against the smaller flange and with the interior of the shroud communicating with said passage through the ports in the block, a housing seated in sealed relation on the latter face of the shroud and providing a fluid pressure cylinder therewithin, a piston disposed in the cylinder and having a piston rod extending outwardly therefrom and into said passage, bolts connecting the housing to the block urging the housing and shroud and block together in sandwiched relation, and a sleeve gate in said block connected to the piston rod to be shifted thereby to cover or uncover said ports.

12. In a 3-way valve having a first fluid flow passageway provided with a laterally opening low pressure port and a sleeve in the passageway shiftable to open and close the port, a fluid pressure cylinder, a tubular piston rod projecting out of the cylinder and connected to the sleeve and provided with a piston land in the cylinder cooperating therewith to define a fluid pressure actuator for the sleeve, said tubular rod opening at one end into the cylinder and at the other end into said passageway, a high pressure port opening into the cylinder for admission of fluid pressure thereto at one side of the piston land and positioned to allow fluid flow into the end of the tubular piston rod when the rod has shifted such that the sleeve covers said laterally opening port, a fluid passage communicating with opposite ends of the cylinder with valve means therein for controlling flow therethrough and with such valve when closed preventing transfer of fluid from that side of the piston land opposite the high pressure port to prevent shifting of the piston to move the sleeve to its low pressure port-blocking position, and said passage when its valve is open allowing transfer of fluid pressure in the cylinder from that side of the land opposite the high pressure port to the opposite end of the cylinder for dumping into the hollow interior of the piston rod thereby allowing shifting of the piston.

13. In a quick-acting prefill valve: a cylindrical fluid flow passage opening outwardly of the valve at one end and surrounded by an annular low pressure passage, a plurality of ports establishing communication between the passages, a sleeve-like valve gate slidably supported in the cylindrical passage for movement axially from one side of the ports to a position blocking flow through the ports, a fluid pressure actuator connected to said sleeve-like valve gate for shifting the gate as aforesaid, said cylindrical flow passage and said sleeve-like valve gate provided with cooperable decelerating means comprising annular opposed lip and shoulder elements with one element on the leading edge of the valve gate as it moves in the direction to block the low pressure ports and the other element disposed in the passage in opposition to the element at the leading edge of the valve gate and disposed at a position substantially juxtaposing such leading edge when the valve gate blocks the ports, and said elements having opposed closing surfaces at least one of which is tapered to provide an escape path into the passage for fluid between the elements as the valve gate nears its port-blocking position.

14. In a quick-acting sleeve valve having a cylindrical flow passageway and a laterally opening port: a sleeve gate in the flow passageway reciprocable between positions either covering or uncovering the port; reciprocating motor means connected to the sleeve gate for rapidly shifting it from at least one to the other of said positions, and said flow passageway and the leading edge of the sleeve gate, as it moves from said one to the other position, having opposed annular shoulder portions defining an annular dashpot upon close approach of the sleeve gate to said other position, for decelerating and substantially stopping the sleeve gate before contact between said shoulder portions.

15. In a quick-acting valve of the prefill type having high and low pressure inlets through which corresponding fluid pressures are admitted to the valve and a discharge port from which low pressure and subsequently high pressure fluid is delivered by the valve, valve means for establishing communication between the low pressure inlet and the discharge port while blocking the high pressure inlet and shiftable to block the low pressure inlet and establish communication between the high pressure inlet and the discharge port, positive displacement fluid pressure motor means connected to the valve means to shift it as aforesaid, said motor means having a fluid pressure inlet passage connected to said high pressure inlet and a fluid pressure outlet passage communicating with said discharge port, and a control valve in one of said passages for controlling operation of the motor, whereby upon opening the control valve the motor is actuated to shift the valve means to block the low pressure inlet and open the high pressure inlet and fluid discharge of the motor is delivered to said discharge port as the valve means is shifting.

16. The invention of claim 15 characterized in that said control valve is in the fluid pressure outlet passage of the motor means and when closed traps fluid under pressure between it and the motor to prevent motor actuation under the influence of high pressure fluid in the inlet passage.

17. The invention of claim 15 characterized in that said control valve includes means for opening it responsive to a predetermined increase of fluid pressure discharging from the discharge port to open the control valve.

18. A three-way prefill valve for the purpose described comprising: a fluid flow passage opening through an end of the valve for communication with a device to be pressurized, a low pressure port opening into said passage for establishing communication with a source of low pressure fluid, a valve element for opening and closing such port, a high pressure port opening into the passage for establishing communication with a source of high pressure fluid, a valve element for opening and closing the high pressure port, fluid pressure actuator means coupled to said valve elements for shifting them in timed relation to block the low pressure port and uncover the high pressure port, said fluid pressure actuator means having an inlet for communication with the source of high pressure fluid and an outlet communicating with said flow passage, a valve in said outlet for trapping high pressure fluid in the actuator means to prevent operation thereof, and said valve when open allowing discharge of high fluid pressure from the actuator means into said flow passage during operation of the actuator means shifting the valve elements to block the low pressure port and uncover the high pressure port.

References Cited

UNITED STATES PATENTS

| | | | |
|---|---|---|---|
| 424,581 | 4/1890 | Sickels | 251—210 |
| 2,394,932 | 2/1946 | Mueller | 251—325 X |
| 3,115,329 | 12/1963 | Wing et al. | 251—31 |
| 3,136,336 | 6/1964 | Priesmeyer | 251—190 X |
| 3,200,831 | 8/1965 | Whitfield | 137—102 |
| 3,219,311 | 11/1965 | Siver | 251—210 X |

WILLIAM F. O'DEA, *Primary Examiner.*

D. J. ZOBKIW, *Assistant Examiner.*